May 14, 1957 — I. A. H. PERRY — 2,791,810
FRICTION STAYS FOR CASEMENTS
Filed Sept. 16, 1953 — 3 Sheets-Sheet 1

INVENTOR
IAN ARTHUR HARCOURT PERRY
BY
ATTORNEY

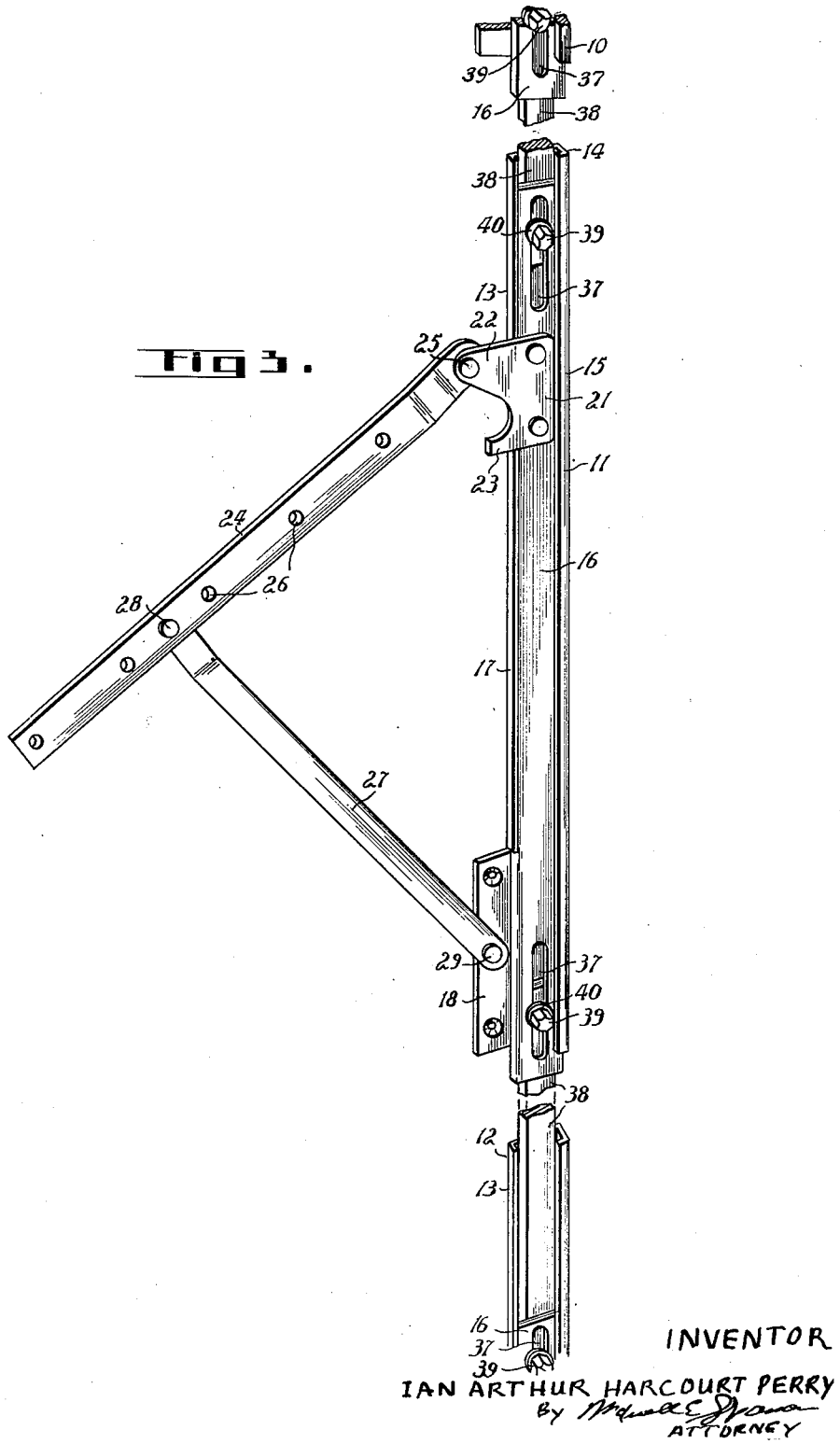

May 14, 1957     I. A. H. PERRY     2,791,810
FRICTION STAYS FOR CASEMENTS
Filed Sept. 16, 1953     3 Sheets-Sheet 3
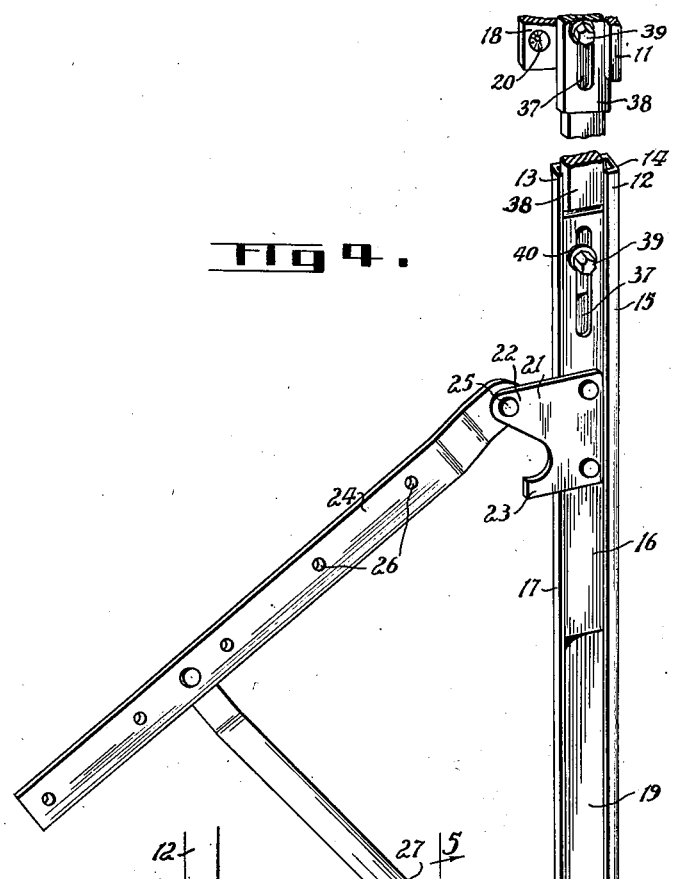
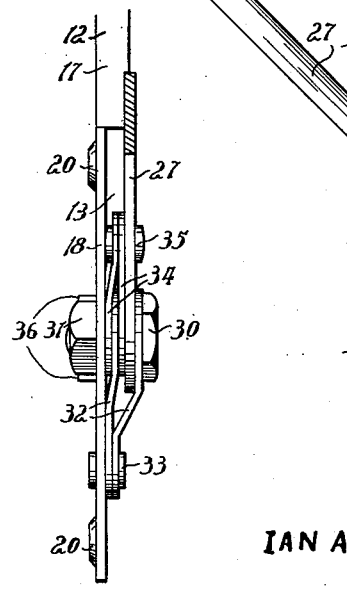
INVENTOR:
IAN ARTHUR HARCOURT PERRY
ATTORNEY United States Patent Office 2,791,810
Patented May 14, 1957

2,791,810

FRICTION STAYS FOR CASEMENTS

Ian Arthur Harcourt Perry, East Brisbane, Queensland, Australia, assignor to Whitco Hardware Manufacturing Co. Pty. Ltd., East Brisbane, Queensland, Australia, a corporation of Queensland Application September 16, 1953, Serial No. 380,556

8 Claims. (Cl. 20—42)

This invention relates to improved friction stays for casements.

A well-known type of window casement friction stay fitting includes a metal base plate which may be screwed to a window sill or head, its inner side being shaped to form a channelled track in which is slidably fitted a shoe with a friction damper. Pivoted to the shoe is a sash plate adapted to be secured by screws to a casement; and a stay arm is pivoted at one end to an end of the base plate and to the other end to the casement plate. Window casements installed with such fittings are very satisfactory; and the fittings have been also used widely for so-called "awning type" casements, in which case the base plates of the friction stay fittings have, of course, been secured to the sides instead of the sill and head, of the window frames. However, awning type casements fitted in this manner are found to have the disadvantage that the uppermost of a set of such casements is often difficult to reach to open or close. Connecting the several awning casements of a set together so that they may be moved in unison is difficult and generally unsatisfactory, and the usual type of friction stay fittings are not capable of being interconnected in such manner that opening or closing one casement of a set will likewise move the other casements.

A further disadvantage is that although initially awning type casements may be held in desired adjusted position by the friction between adjacent parts of the friction stay fittings, after the fittings have been in use for some time and have worn, the casements are likely to drop, or be easily blown, to closed position, particularly from only slightly opened position. Moreover, the friction necessary between the parts of a pair of friction stays applied to a large and heavy casement in order that the casement may be retained in adjusted position will, of course, be greater than in the case of a relatively small and light casement; but no means have hitherto been provided whereby the friction between parts of window casement friction stay fittings may be adjustably varied.

The present invention has been devised with the principal object of providing friction stay fittings which are of such character that they may be used for a series of casements, ordinarily of the "awning" type but, if desired, of the more usual vertical type, the fittings being such that the opening or closing of one casement of the set will correspondingly open or close the other casements of the set, means being provided whereby the friction between adjacent fixed and movable parts of the fitting may be adjustably varied to compensate for wear in the friction surfaces, and to make the fitting suitable for different sizes and weights of casements.

According to the present invention, I provide a casement friction stay assembly including at least two fittings, each of which has a track adapted to be secured to a window frame, and a shoe slidable in the track. A sash plate is pivoted at one end to each shoe, and is adapted to be secured, ordinarily by screws, to a casement, and a stay is pivoted at one end to the track and at the other end to the sash plate. The pivotal connection of the sash plate to the shoe is off-set forwardly of the track in which the shoe travels, and the pivotal connection of the stay to the track is off-set forwardly of the path of the shoe for a lesser distance. The two or more fittings are aligned on the window frame, and I provide connecting rods or links, each of which is adapted to be connected adjustably at one end to the shoe of one fitting, and at the other end to the shoe of the next fitting. A friction damper device is associated with one of the fittings and is adapted to brake frictionally the movement of the sash plates pivoted to the interconnected shoes of the two or more fittings, the friction damper having at least one fixed friction surface associated with the track, and engaging with at least one movable friction surface associated and movable with the stay, a screw-threaded adjustment device being provided whereby the pressure between adjacent friction surfaces may be adjustably varied.

In the drawings:

Figure 3 is a perspective view of the intermediate fitting showing the means, partly broken away, connecting the intermediate fitting to the uppermost and lowermost fittings, parts of which are also shown;

Figure 4 is a perspective view of the lowermost friction stay fitting of the set, and the means, partly broken away, connecting this fitting to the intermediate fitting, part of which is also shown; and Figure 5 is a sectional view, to enlarged scale, along line 5—5 of Figure 4.

Figures 1, 2:
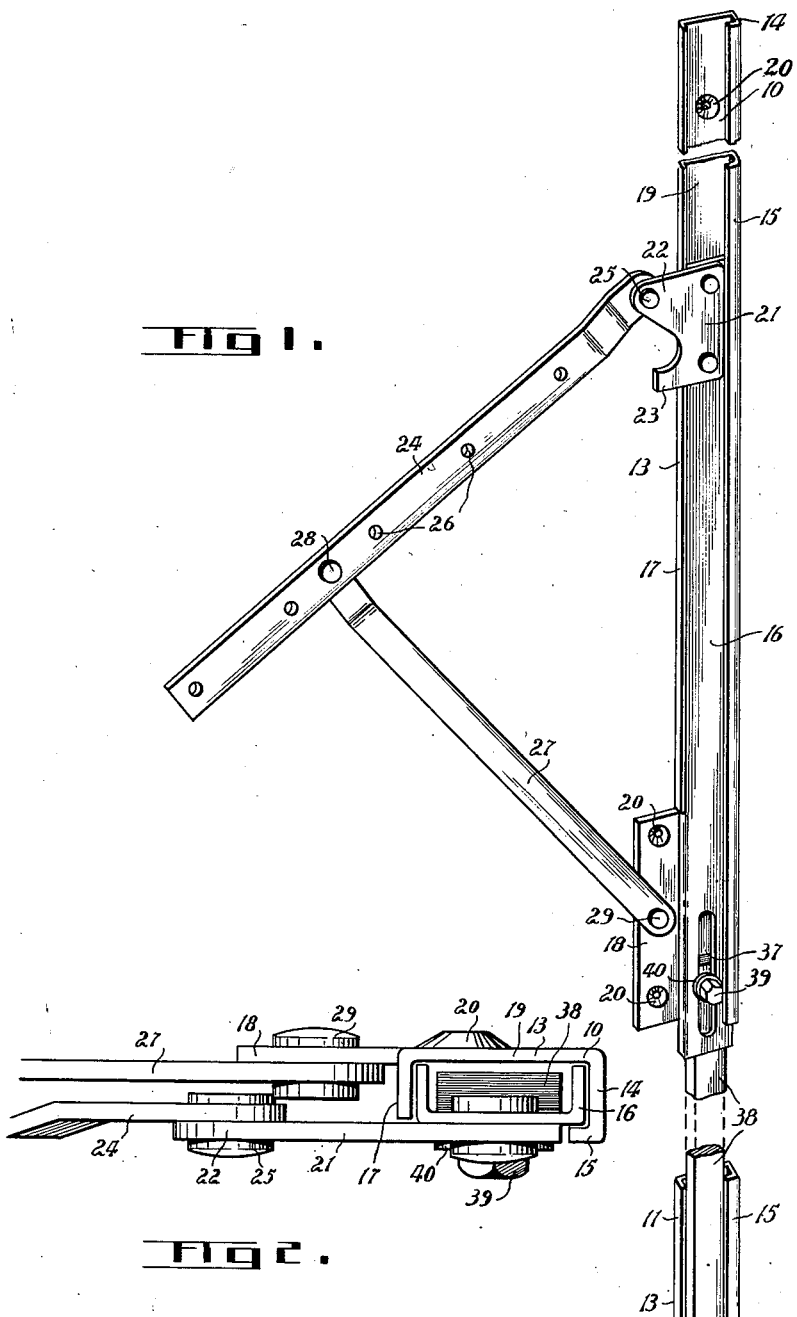
Figure 1 is a perspective view of the uppermost friction stay fitting of a set of three fittings, showing also the means, partly broken away, interconnecting this uppermost fitting to the intermediate fitting, part of which is also illustrated.
Figure 2 is a plan view, to enlarged scale, of the uppermost fitting shown in Figure 1.

The set of friction stay fittings illustrated is one of a pair of such sets which are arranged oppositely, but are otherwise similar, and which are for use with a series of three awning type casements to be arranged in a window opening one above the other. Each set of fittings includes an upper fitting 10, an intermediate fitting 11 and a lower fitting 12.

Each of the friction stay fittings includes a track 13 made of sheet metal which for the greater part is channelled, the inside or rear web 14 of the channel furthermore having its edge portion bent over forwardly to form a retaining flange 15.

Slidable along the track 13 is a channelled sheet metal shoe 16, its channel facing oppositely to that of the track. The shoe fits closely between the rear web 14 and the front web 17 of the track, and it is retained slidably in place by the retaining flange 15.

The front web 17 of the track 13 does not extend down to the bottom of the track, there being provided instead, at the lower front of the track, a forwardly extending affixture lug 18 which, with the middle part 19 of the track is adapted to lie flush against the side member of a window frame. Counter-sunk screw holes are formed in the middle part 19 of the track and the affixture lug 18 as indicated at 20, whereby the fitting may be secured to the window frame. Although round counter-sunk screw holes are illustrated, it may be preferred to provide at least one slotted screw-hole, so that the fitting may be held in place by a screw passing therethrough, and while so held adjusted vertically before screws are driven through other round screw holes.

Riveted to the shoe 16 of each fitting is a shoe bracket 21, consisting of a sheet metal element extending forwardly of the shoe and track, its front part being shaped to form at the top a sash plate pivot lug 22 and at bottom a stop 23. In the case of the intermediate fitting 11 and the lower fitting 12, the shoe bracket 21 is located some distance below the top of the shoe; but in the case of the upper fitting 10 the shoe is somewhat shorter than the shoe of the intermediate fitting 11, and the shoe bracket 21 is secured to its top. The shoe 16 of the lower fitting 12 extends a shorter distance below the shoe bracket 21 than is the case in either of the other two fittings.

In each fitting, one end of a sash plate 24 is pivoted by a rivet 25 to the sash plate pivot lug 22, the said plate being formed with a series of screw holes 26 whereby the plate may be secured by screws to a side of an awning casement.

A stay arm 27 has one end pivoted by a rivet 28 to an intermediate position on the sash plate 24, its other end being pivoted to the affixture lug 18. In the case of the upper fitting 10 and the intermediate fitting 11, the pivotal connection of the stay arm 27 to the affixture lug 18 consists of a rivet 29. In the case of the lower fitting, however, the pivot consists of a bolt 30 engaged by a nut 31, and a friction damper device is associated with this pivot. Two metal leaves 32 are secured at one end by a rivet 33 to the affixture lug 18, and two metal leaves 34 are secured at one end by a rivet 35 to the stay arm 27 of the lower fitting 12. The bolt 30 passes through registering holes in the other end of one of the leaves 32, in the stay arm 27, in one of the leaves 34, in the other leaf 32, in the other leaf 34, and in the affixture lug 18 before being engaged by the nut 31, which is restrained against rotation by a pair of lugs 36 extending from the said affixture lug. It is preferred that if the stay arm 27 and the affixture lug 18 be of steel that the outer leaf 32 and both of the leaves 34 be of brass, the other leaf 32 being of steel. By tightening or loosening the bolt 30, the degree of friction between the affixture lug 18 and the fixed leaves 32 associated therewith on the one hand, and the leaves 34 and the stay arm 27 with which the said leaves 34 are associated and movable on the other hand may be increased or decreased.

It will be noted that in each fixture, the pivotal connection of the sash plate 24 to the sash plate pivot lug 22 at 25 is disposed forwardly of the pivotal connection of the stay arm 27 to the affixture lug 18 at 29, in the case of the upper and intermediate fittings, and at 30 in the case of the lower fitting.

In the lower part of the shoe 16 of the upper fitting 10, in each end of the shoe of the intermediate fitting 11, and in the upper end of the shoe of the lower fitting 12, there is formed a longitudinal slot 37. There are provided two connecting links 38 of metal bar, one of which has its upper end housed in the lower part of the shoe 16 of the upper fitting 10 and its lower end housed in the upper part of the shoe 16 of the intermediate fitting 11. The other link has its upper end housed in the lower end of the shoe 16 of the intermediate fitting 11, and its lower end housed in the upper end of the shoe 16 of the lower fitting 12. The links are secured to the shoes in which their ends are housed by means of screws 39 each passing through a washer 40, through a slot 37, and engaging in a tapped hole in the link.

In use, the set of fittings is secured by screws to a side of a window frame, an oppositely arranged but otherwise similar set of fittings being likewise secured to the other side of the frame; and the sash plates are screwed to the sides of three awning type casements. The stops 23 which limit the rearward movement of the sash plates 24 assist in the accurate installation of the fittings. The greater part of each set of fittings is concealed behind a cover strip. The fittings are so arranged and adjusted that when the lowermost casement is opened, the other two casements are likewise opened, and when the lowermost casement is closed, so also are the other two. It is preferred that the adjustment of the fittings be such that, when the lowermost casement is drawn towards closed position, the other two casements are simultaneously brought to fully closed position just before the lowermost casement is fully closed. The final closing movement of the lowermost casement, then, will force the other two casements tightly closed. A catch of any suitable well-known type is associated with the lowermost casement, being adapted to hold this casement, and therefore the other two casements, firmly closed. If it is found at any time that the casements are liable to drop gravitationally, or be easily blown, to closed position, the bolt 30 of the friction damper device may be easily and conveniently tightened, with the result that additional force will be necessary to bring the casements to closed position.

The invention is applicable, of course, to a series of two awning casements, the intermediate fitting being dispensed with; or to a series of more than three casements by the addition of further intermediate friction stay fittings. The invention will also be found advantageous in some cases when applied to a series of casements arranged side by side instead of one above the other, then it is desirable that all such casements should be opened and closed correspondingly and simultaneously.

What I claim is:

1. A friction stay for casements including at least two fittings, each having a track adapted to be secured to a side of a window frame, a shoe slidable in the track, a sash plate pivoted at one end to the shoe and adapted to be secured to a side of a casement, a stay pivoted at one end to the track and at the other end to the sash plate, the pivotal connection of the stay plate to the shoe being off-set forwardly of the track in which the shoe travels and the pivotal connection of the stay to the track being off-set forwardly of the shoe or its path for a lesser distance, a connecting rod releasably and adjustably connecting the shoe of the one fitting with the aligned shoe of the other fitting, and a friction damper at the pivotal connection of the stay plate to the track of one of the fittings.

2. A friction stay for casements according to claim 1 wherein in each fitting the track is a channel-piece; the shoe is an oppositely arranged channel-piece longitudinally slidable in the channelled track; the sash plate is pivoted to a bracket secured to and extending forwardly of the shoe; and the stay is pivoted at one end to a lug extending forwardly of the lower part of the track.

3. A friction stay for casements including at least two fittings, each having a channelled track adapted to be secured to a side of a window frame, a shoe consisting of a reversed channel longitudinally slidable in the channelled track; a bracket secured to and extending forwardly of the shoe; a longitudinal retaining flange extending forwardly from the rear web of the track and adapted to retain the shoe in the track, a lug extending forwardly from the lower part of the track, a sash plate pivoted at one end to the bracket and adapted to be secured to a side of a casement, a stay plate pivoted at one end to the lug and at the other end to the sash plate, the pivotal connection of the stay plate to the bracket being off-set forwardly of the track and the pivotal connection of the stay to the lug being offset forwardly of the track to a lesser distance, a connecting rod having its ends adjustably and releasably secured in the near ends of the channelled shoes of aligned fittings, and a friction damper at the pivotal connection of the stay plate to the track of one of the fittings.

4. A friction stay for casements according to claim 3 wherein the friction damper consists of a bolt passing through registering holes in the stay and the track and an alternating arrangement of metal leaves secured to the stay and metal leaves secured to the track and engaging in a nut.

5. A friction stay for casements according to claim 3 wherein there is secured to the shoe of each fitting a stop adapted to prevent the sash plate from moving pivotally rearwards beyond a position at which it is substantially parallel to the track.

6. A friction stay for casements including at least two fittings, each having a track adapted to be secured to a side of a window frame, a shoe slidable in the track, a sash plate pivoted at one end to the shoe and adapted to be secured to a side of a casement, a stay pivoted at one end to the track and at the other end to the sash plate, a connecting link releasably and longitudinally adjustably connecting the shoe of the one fitting with the aligned shoe of the other fitting, and a friction damper at the pivotal connection of the stay to the track of one of the fittings, the friction damper having at least one fixed friction surface associated with the track, and engaging at least one movable friction surface associated and movable with the stay, and a screw-threaded adjustment means adapted to regulate the pressure between the engaging friction surfaces; the friction damper being adapted to brake frictionally the movement of the stay and other interconnected moving parts of the fitting relative to the track.

7. A friction stay for casements including at least two fittings, each having a track adapted to be secured to a side of a window frame, a shoe slidable in the track, a sash plate pivoted at one end to the shoe and adapted to be secured to a side of a casement, a stay pivoted at one end to the sash plate, the pivotal connection of the stay plate to the shoe being off-set forwardly of the track in which the shoe travels and the pivotal connection of the stay to the track being off-set forwardly of the shoe or its path for a lesser distance, a connecting link releasably and longitudinally adjustably connecting the shoe of the one fitting with the aligned shoe of the other fitting, and a friction damper at the pivotal connection of the stay to the track of one of the fittings, the friction damper having at least one fixed friction surface associated with the track, and engaging with at least one movable friction surface associated and movable with the stay, the pivotal connection between the track and the stay being effected by a bolt passing through said friction surfaces and engaging a nut; the friction damper being adapted to brake frictionally the movement of the stay and other interconnected moving parts of the fitting relative to the track, the bolt being adapted to be tightened or loosened to regulate the pressure between engaging friction surfaces.

8. A friction stay for casements according to claim 7, wherein there is secured to the shoe of each fitting a stop adapted to prevent the sash plate from moving pivotally rearwards beyond a position at which it is substantially parallel to the track.

References Cited in the file of this patent

UNITED STATES PATENTS

| | | |
|---|---|---|
| 2,090,133 | Larson | Aug. 17, 1937 |
| 2,158,714 | Wiley | May 16, 1939 |